US008867383B2

(12) United States Patent
Frenger et al.

(10) Patent No.: US 8,867,383 B2
(45) Date of Patent: Oct. 21, 2014

(54) METHOD FOR ASSOCIATING MOBILE STATIONS WITH REPEATERS IN CONTROLLING BASE STATION

(75) Inventors: Pål Frenger, Linköping (SE); Niklas Johansson, Sollentuna (SE); Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 694 days.

(21) Appl. No.: 13/002,081

(22) PCT Filed: Sep. 15, 2008

(86) PCT No.: PCT/SE2008/051033
§ 371 (c)(1),
(2), (4) Date: Dec. 30, 2010

(87) PCT Pub. No.: WO2010/002304
PCT Pub. Date: Jan. 7, 2010

(65) Prior Publication Data
US 2011/0110261 A1      May 12, 2011

Related U.S. Application Data

(60) Provisional application No. 61/077,691, filed on Jul. 2, 2008.

(51) Int. Cl.
*H04L 12/26* (2006.01)
*H04L 5/14* (2006.01)
*H04L 12/28* (2006.01)

(52) U.S. Cl.
USPC .............................. 370/252; 370/274; 370/254

(58) Field of Classification Search
USPC .......................... 370/252–254, 274, 331–332
See application file for complete search history.

(56) References Cited

U.S. PATENT DOCUMENTS

| 5,432,843 A | * | 7/1995 | Bonta ............................. 455/438 |
| 6,628,642 B1 | * | 9/2003 | Mile'n et al. ................. 370/350 |
| 2004/0063455 A1 | * | 4/2004 | Eran et al. .................... 455/525 |
| 2007/0153758 A1 | | 7/2007 | Kang et al. |
| 2007/0178911 A1 | * | 8/2007 | Baumeister et al. ....... 455/456.1 |
| 2007/0207757 A1 | * | 9/2007 | Qi et al. .................... 455/226.1 |
| 2008/0144522 A1 | | 6/2008 | Chang et al. |

OTHER PUBLICATIONS

International Search Report for PCT/SE2008/051033, mailed Mar. 31, 2009.
Written Opinion of the International Searching Authority for PCT/SE2008/051033, mailed Mar. 31, 2009.
International Preliminary Report on Patentability for PCT/SE2008/051033, dated Apr. 8, 2010.
Ericsson: "A Discussion on Some Technology Components for LTE-Advanced", Agenda Item 6.2, TSG-RAN Wg1 #53, R1-082024, (May 5-9, 2008), 11 pages.

* cited by examiner

*Primary Examiner* — Ebrahim Golabbakhsh
(74) *Attorney, Agent, or Firm* — Nixon & Vanderhye P.C.

(57) ABSTRACT

A method may include determining an association between repeaters and mobile stations in a controlling eNodeB of a multi-hop wireless environment. The method may include receiving channel estimations based on reference signals transmitted by said mobile stations. The method may be implemented a wireless environment when legacy LTE UEs are present.

20 Claims, 13 Drawing Sheets

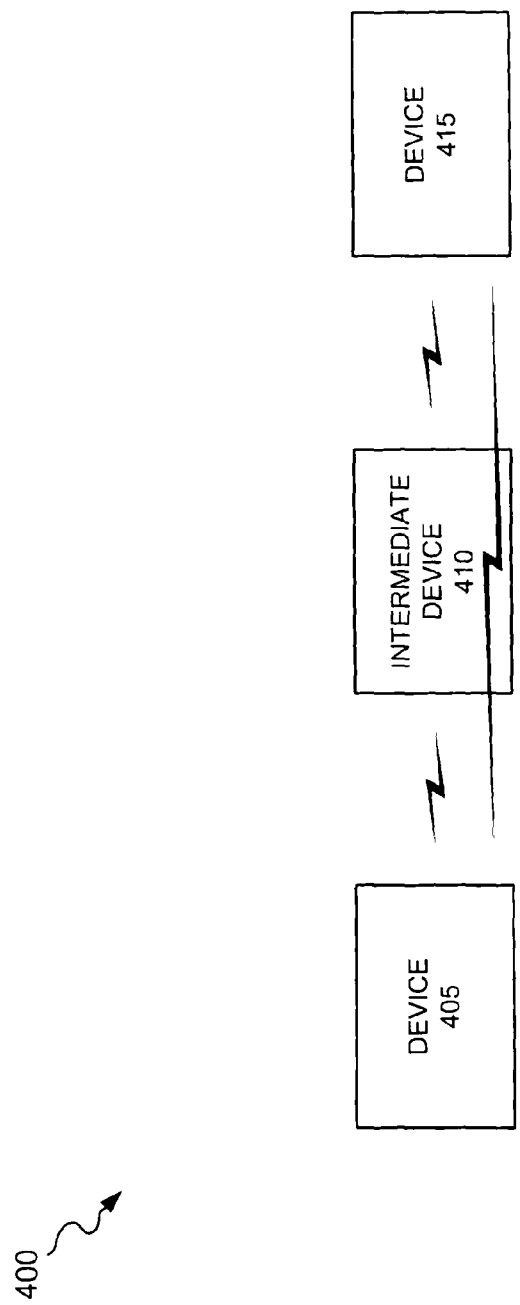

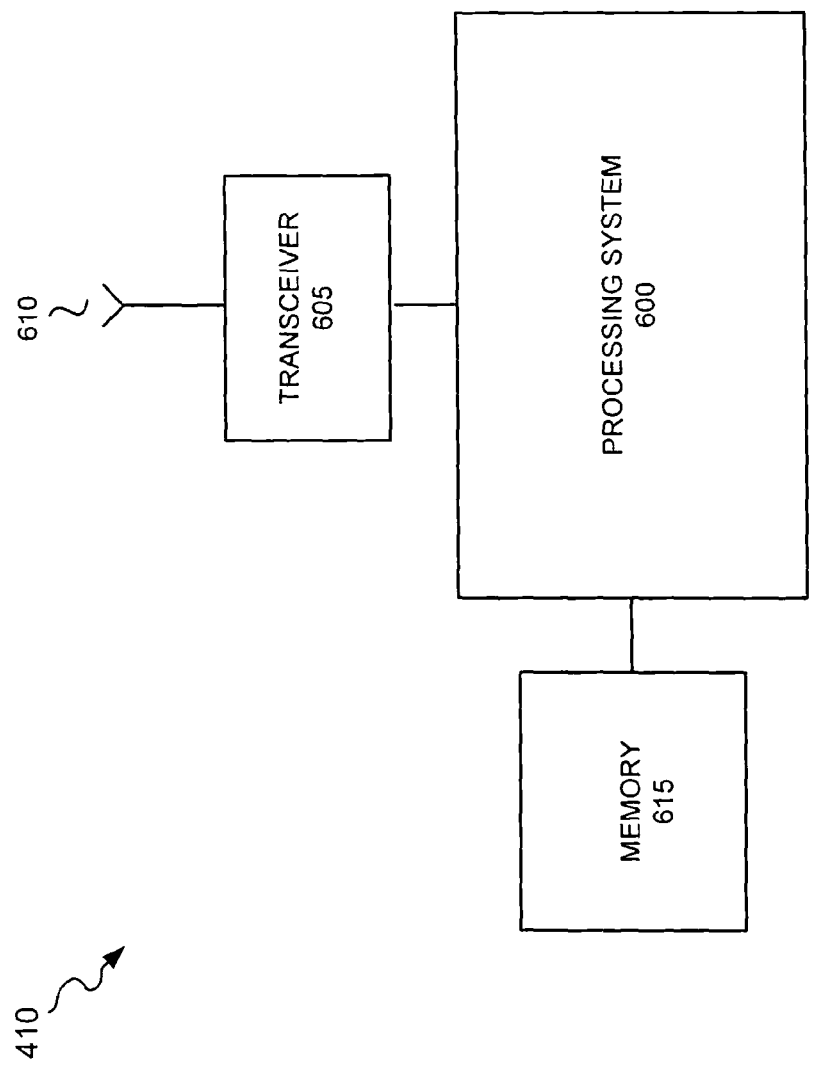

METHOD FOR ASSOCIATING MOBILE STATIONS WITH REPEATERS IN CONTROLLING BASE STATION

This application is the U.S. national phase of International Application No. PCT/SE2008/051033, filed 15 Sep. 2008, which designated the U.S., and claims the benefit of U.S. Provisional No. 61/077,691, the entire contents of each of which are hereby incorporated by reference.

TECHNICAL FIELD

Implementations described herein relate generally to a communication system. More particularly, implementations described herein relate to a scheme for determining an association between devices (e.g., a repeater and user equipment) in a communication system.

BACKGROUND

Frequency selective L1 repeaters controlled by an eNodeB are being considered for inclusion in the Long term Evolution (LTE)-Advanced concept currently being developed by 3GPP. A frequency selective repeater can be controlled by an eNodeB to only repeat resources that are in use by user equipment (UE) scheduled by that eNodeB. Furthermore, a UE with a strong radio link to the serving eNodeB does not need support from the repeater. Hence, resources used to communicate to and from that UE should be turned off by the repeater so that unnecessary interference is not forwarded by the repeater.

In order for frequency selective repeaters to work efficiently, the eNodeB needs to be able to associate each UE with one or more serving repeaters, as illustrated in FIG. 1. For example, eNodeB 115 may control repeaters 110-1 and 110-2 and serve UEs 105-1, 105-2, and 105-3. The UEs may be associated with one or more repeaters. Thus, one problem that needs to be solved in order for frequency selective repeaters to work as intended is that eNodeB 115 needs a method to obtain a repeater association for each UE. For example, either the UE is connected directly to the serving eNodeB or via one or more controlled repeaters.

There are existing techniques to associate a repeater with a serving eNodeB. For example, as illustrated in FIG. 2, repeater 110-1 may transmit a reference signal to UE 105-2. UE 105-2 may perform measurements based on a transmitted reference signal. UE 105-2 may report the measurements to eNodeB 115. The feedback report from UE 105-2 must be based on measurements of resources that are known to be repeated. However, a problem with this technique is that it cannot be used for LTE as specified in 3GPP Release 8 and below UEs, since they are not aware of the new reference signals that must be transmitted from the repeater (e.g. repeater 110-1). Hence, for support of legacy UEs in an evolved LTE system (e.g. LTE Release 10, also known as LTE-Advanced), this technique may not be used.

With respect to another technique, as illustrated in FIG. 3, eNodeB 115 may transmit a reference signal to UE 105-2. UE 105-2 may perform channel quality indicator (CQI) measurements based on the received reference signal. The measurements of UE 105-2 may be frequency selective. UE 105-2 may transmit a feedback report to eNodeB 115 via repeater 110-1. Assuming that eNodeB 115 knows the frequency selective gain vector of each controlled repeater (e.g., repeater 110-1), it is possible to derive the UE-to-repeater association from the feedback report. That is, the reference signal is transmitted by eNodeB 115, UE 105-2 performs measurements, and then provides a feedback report back to eNodeB 115. However, a problem with this technique is that it is indirect and slow. It might be required to determine the UE-to-repeater association by first turning a repeater off and then wait for CQI feedback. After that, the same repeater is turned on and the new CQI feedback can be compared with the previously received feedback. If there is any significant difference between the CQI reports received by a UE when a specific repeater is turned off or on respectively then this is an indication that the UE probably should be associated with the corresponding repeater. If there is no significant difference then eNodeB 115 might try to test the same procedure with another repeater. This procedure takes some time and also there is always the possibility that an observed difference in received CQI reports from a UE depends on something else than the fact that a certain repeater was turned on. The UE could e.g. have been shadowed by a building when the first CQI report was derived and then moved around a corner which resulted in a line-of-sight situation when the second CQI report was calculated.

In order to make efficient use of controllable frequency selective repeaters, eNodeB 115 needs to be able to determine which resources should be turned on or turned off for each controlled repeater. When assigning an uplink grant to a UE served by a repeater, eNodeB 115 ensures that the serving repeater has turned on those resources. Also, when communicating in the downlink to a UE, which is served by a repeater, eNodeB 115 uses only resources that are turned on in the serving repeater. This is typically solved by determining an association between the UE and the repeater.

SUMMARY

It is an object to obviate at least some of the above disadvantages and to improve the operability of devices within a communication system.

According to one aspect, a method may be performed in a multi-hop wireless network by a device that is communicatively coupled to one or more intermediate devices and another device, which may be characterized by assigning a resource to the other device to be utilized by the other device for a transmission, informing the one or more intermediate devices of the assignment, measuring the transmission received from the other device, receiving one or more measurements of the transmission from the one or more intermediate devices, and determining whether one or more of the one or more intermediate devices are to be associated with the other device based on the measured transmission and the received measurements.

According to another aspect, a method may be performed by an intermediate device in a multi-hop wireless network, which may be characterized by receiving a request to measure a signal included in a resource granted to a device, measuring the signal, and reporting the measurement to another device to determine whether the intermediate device is to be associated with the device.

According to still another aspect, a device capable of operating in a wireless environment may be characterized by one or more antennas, and a processing system to assign a resource to another device to be utilized by the other device for a transmission to the device, inform one or more intermediate devices of the assignment of the resource, receive a signal in the assigned resource of the transmission, measure the signal, receive one or more measurements of the signal from the one or more intermediate devices, and determine whether to associate one or more of the one or more intermediate devices with the other device based on the measured signal and the one or more measurements.

According to yet another aspect, an intermediate device capable of operating in a multi-hop wireless environment may be characterized by one or more antennas, and a processing system to receive a request to measure a signal included in a resource granted to another device for transmitting the signal, measure the signal, and report a result of the signal measured to a device to which the request originated so that the device can determine whether to associate the intermediate device with the other device.

According to another aspect, a computer program including instructions to control the operation of one or more intermediate devices in a multi-hop wireless environment, where the instructions may include instructions for assigning to a user equipment an uplink resource for transmitting a reference signal, instructions for analyzing one or more measurements of the reference signal from the one or more intermediate devices, instructions for determining whether to associate one or more of the one or more intermediate devices with the user equipment based on the analyzing of the one or more measurements, and instructions for controlling an operation performed by the one or more of the one or more intermediate devices when it is determined that the one or more of the one or more intermediate devices are to be associated with the user equipment.

BRIEF DESCRIPTION OF THE DRAWINGS

FIG. 4A is a diagram illustrating devices communicating with one another via an intermediate device;

FIG. 6A is a diagram illustrating exemplary components of the repeater depicted in FIG. 4B;

DETAILED DESCRIPTION

Figure 1:
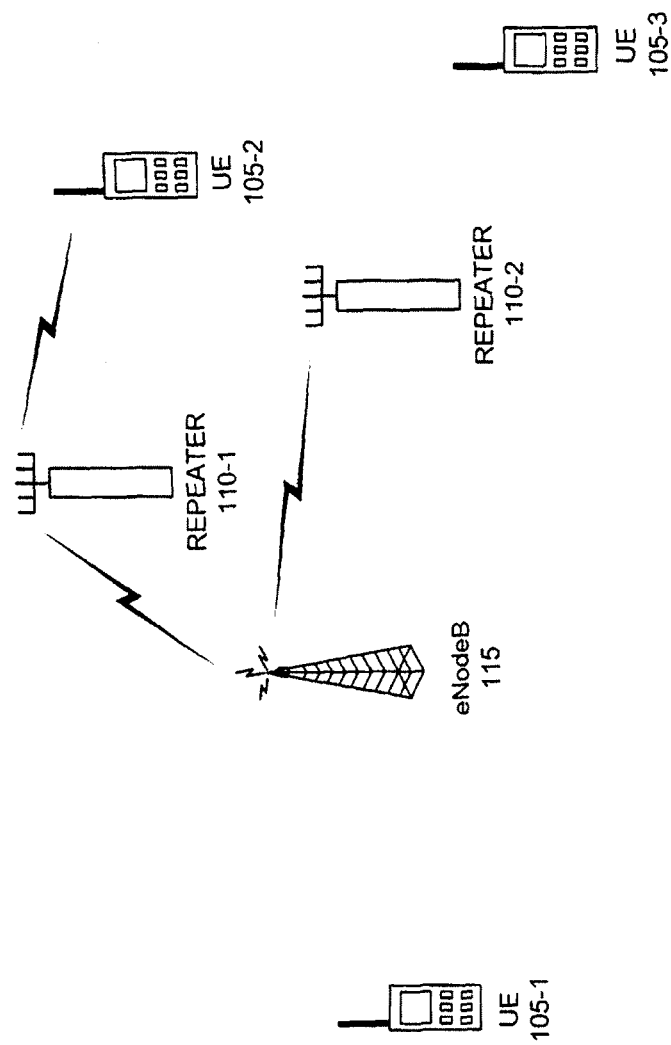
FIG. 1 is a diagram illustrating the concept of an eNodeB managing an association between UEs and repeaters.
Figure 2:
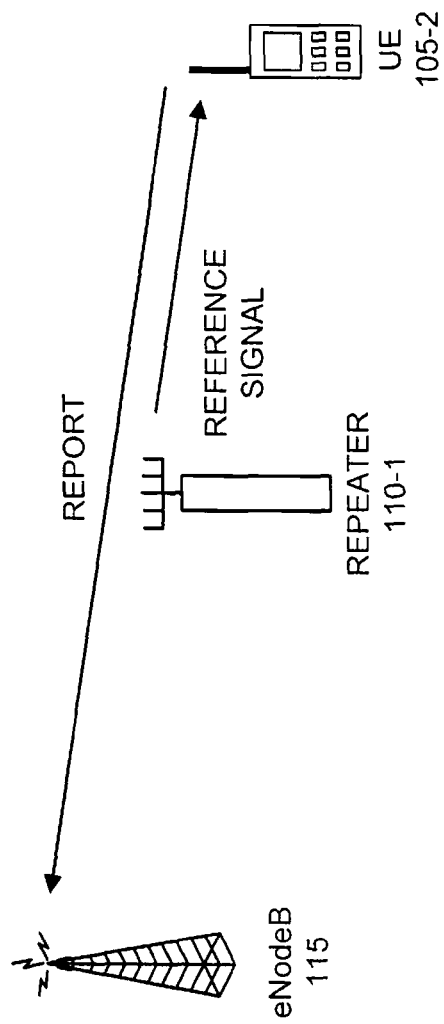
FIGS. 2 and 3 are diagrams illustrating existing techniques for associating a UE with a repeater.
Figure 3:
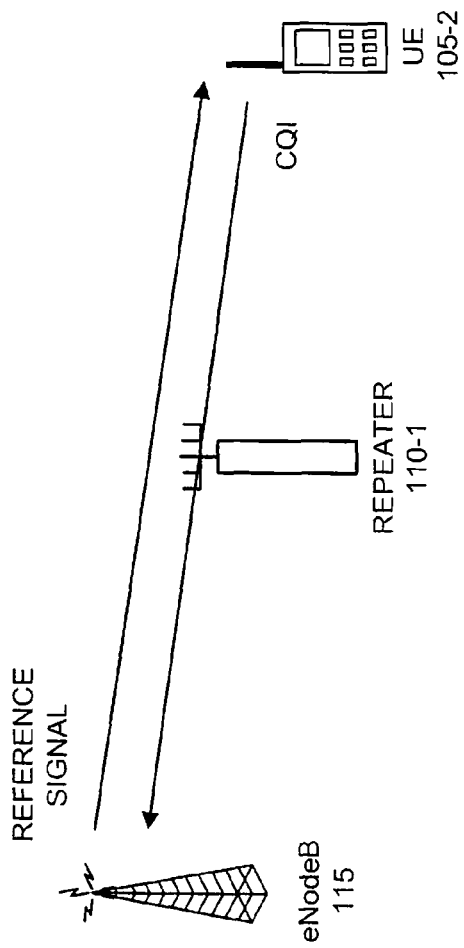

The following detailed description refers to the accompanying drawings. The same reference numbers in different drawings may identify the same or similar elements. Also, the following description does not limit the invention.

The concepts described herein relate to a communication system. The communication system may include a multi-hop communication system in which intermediate devices (e.g., repeater, relay, etc.) may be employed. For purposes of discussion, the concepts will be described with respect to a multi-hop LTE communication system. The multi-hop LTE communication system may support legacy UEs (e.g. Release 8 and below). However, it will be appreciated that the concepts described may have broader application. For example, any multi-hop communication that determines associations between devices may benefit from the description provided herein.

Embodiments described herein may provide a scheme for determining an association between devices (e.g., controllable repeaters and UEs). The association scheme may include utilizing reference signals included in the LTE standard for allowing a controlling device (e.g., an eNodeB) to determine the association. For example, the eNodeB and the controlled repeaters may perform measurements on the reference signals. The controlled repeaters may forward their measurements to the eNodeB. The eNodeB may determine which, if any, of the controlled repeaters should be associated with the UE based on its measurements (i.e., the eNodeB) and/or the measurements received from the controlled repeaters. The eNodeB may control the repeaters based on the determined association.

This scheme provides an efficient use of channel resources for determining associations between controllable repeaters and UEs. Additionally, or alternatively, the scheme may be utilized for legacy UEs, enhance connectivity within a multi-hop communication system, improve quality of service, etc., as well as other advantages that necessarily flow therefrom.

FIG. 4A is a diagram illustrating an exemplary communication system 400 in which the concepts described herein may be implemented. As illustrated, communication system 400 may include a device 405, an intermediate device 410, and a device 415. A device may include, for example, a UE, a gateway, a base station, a relay, a repeater, a combination thereof, or another type of device (e.g., a satellite). The device may operate at layer 1, layer 2, and/or at a higher layer. As illustrated in FIG. 4A, the devices may be communicatively coupled. For example, the devices may be communicatively coupled via wireless communication links (e.g., radio, microwave, etc.). Communication system 400 may operate according to the LTE communication standard.

Figure 4B:
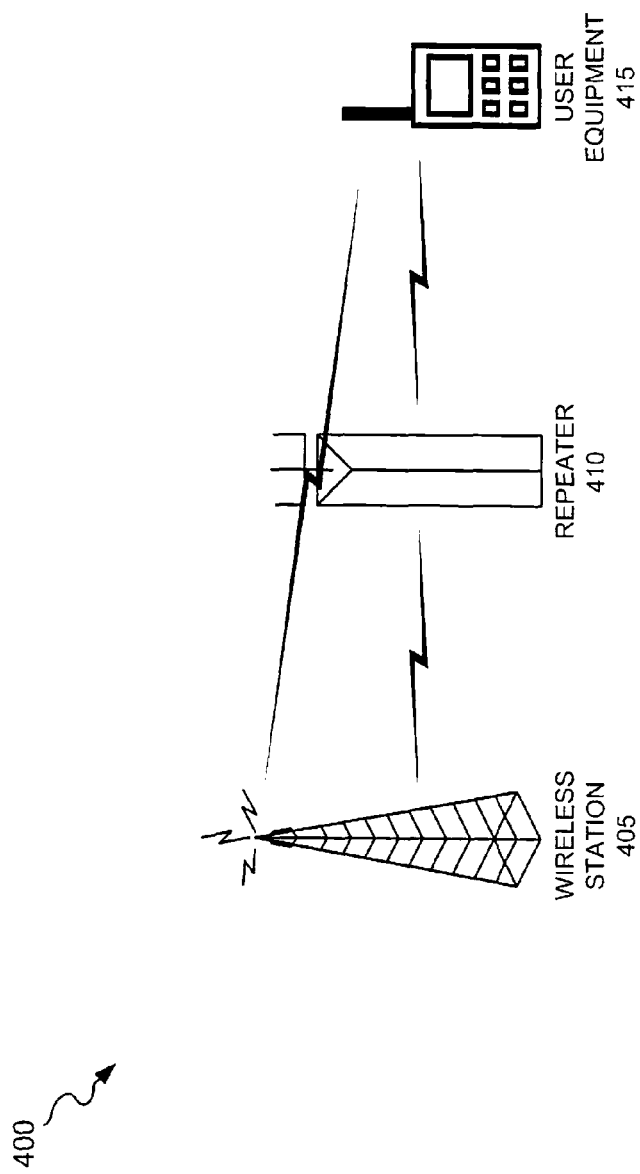
FIG. 4B is a diagram illustrating an exemplary implementation of the devices depicted in FIG. 4A.

FIG. 4B illustrates an exemplary implementation in which device 405 includes a wireless station, intermediate device 410 includes a repeater, and device 415 includes a UE. FIG. 4B illustrates wireless station 405, repeater 410 and UE 415 as communicatively coupled to form a multi-hop network. Wireless station 405 may include an eNodeB. Repeater 410 may, among other things, forward signals, and may operate at layer one, layer two, and/or at a higher layer. UE 415 may include, for example, a telephone, a computer, a personal digital assistant (PDA), a gaming device, a music playing device, a video playing device, a web browser, a personal communication system (PCS) terminal, a pervasive computing device, and/or some other type of communication device.

Although FIGS. 4A and 4B illustrate an exemplary communication system 400, in other implementations, it will be appreciated that, among other things, the number of devices, the kind of devices, the arrangement of the devices, etc., may be different.

Figure 5A:
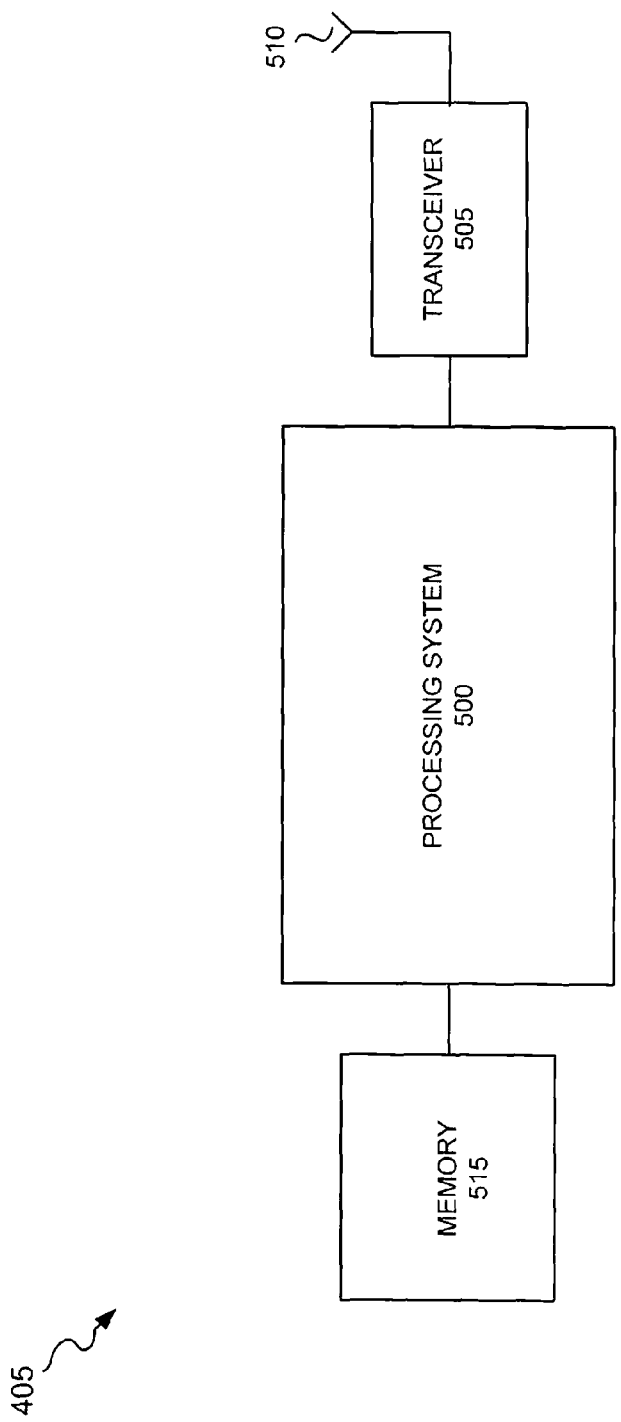
FIG. 5A is a diagram illustrating exemplary components of the wireless station depicted in FIG. 4B.

FIG. 5A is a diagram illustrating exemplary components of wireless station 405. The term component is intended to be broadly interpreted to include, for example, hardware, software and hardware, firmware, software, or some other type of component and/or combination of components. As illustrated, wireless station 405 may include a processing system 500, a transceiver 505, an antenna 510, and a memory 515.

Processing system 500 may include a component capable of interpreting and/or executing instructions. For example, processing system 500 may include, a general-purpose processor, a microprocessor, a data processor, a co-processor, a network processor, an application specific integrated circuit (ASIC), a controller, a programmable logic device, a chipset, and/or a field programmable gate array (FPGA). Processing system 500 may control one or more other components of wireless station 405. Processing system 500 may be capable of performing various communication-related processing (e.g. signal processing, channel estimation, beam forming, power control, scheduling, etc.).

Transceiver 505 may include a component capable of transmitting and/or receiving information over wireless channels via antennas 510. For example, transceiver 505 may include a transmitter and a receiver. Transceiver 505 may be capable of performing various communication-related processing (e.g., de/modulation, de/interleaving, equalizing, filtering, de/coding, signal measurement, etc.). Antenna 510 may include a component capable of receiving information and transmitting information via wireless channels. Antenna 510 may include a single or a multi-antenna system (e.g., a MIMO antenna system). Antenna 510 may provide one or more forms of diversity (e.g., spatial, pattern, or polarization).

Memory 515 may include a component capable of storing information (e.g. data and/or instructions). For example, memory 515 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Although FIG. 5A illustrates exemplary components of wireless station 405, in other implementations, wireless station 405 may include fewer, additional, and/or different components than those depicted in FIG. 5A. It will be appreciated that one or more components of wireless station 405 may be capable of performing one or more other tasks associated with one or more other components of wireless station 405.

Figure 5B:
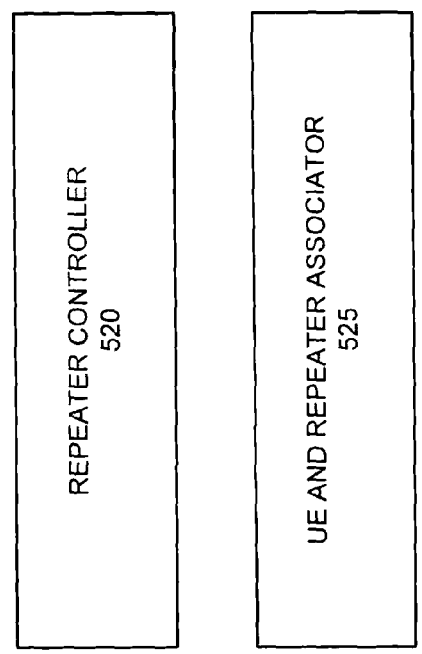
FIG. 5B is a diagram illustrating exemplary functional components of the wireless station.

FIG. 5B is a diagram illustrating exemplary functional components capable of performing one or more operations associated with the concepts described herein. In one embodiment the exemplary functional components may be implemented in processing system 500 of wireless station 405. However, it will be appreciated that these functional components may be implemented in connection with, for example, other components (e.g., transceiver 505) of wireless station 405, in combination with two or more components (e.g. processing system 500, transceiver 505, memory 515) of wireless station 405, and/or as an additional component(s) to those previously described in FIG. 5A. As illustrated, the functional components may include a repeater controller 520 and a UE and repeater associator 525.

Repeater controller 520 may include a component capable of managing repeaters. For example, repeater controller 520 may be capable of turning on or turning off a repeater (e.g., repeater 410), directing a repeater to measure signals, and controlling the frequency spectrum in which the repeater operates in relation to other devices.

UE and repeater associator 525 may include a component capable of determining an association between a repeater and a UE. UE and repeater associator 525 may determine an association based on measurements of reference signals (e.g., sounding reference signals (SRS), which will be described below). As will be described, UE and repeater associator 525 may receive measurements from a repeater which may be used to determine an association.

Although FIG. 5B illustrates exemplary functional components, in other implementations, wireless station 405 may include fewer, additional, and/or different functional components than those depicted in FIG. 5B. It will be appreciated that one or more functional components of wireless station 405 may be capable of performing one or more other tasks associated with one or more other functional components of wireless station 405.

FIG. 6A is a diagram illustrating exemplary components of repeater 410. As illustrated, repeater 410 may include a processing system 600, a transceiver 605, an antenna 610, and a memory 615.

Processing system 600 may include a component capable of interpreting and/or executing instructions. For example, processing system 600 may include, a general-purpose processor, a microprocessor, a data processor, a co-processor, a network processor, an application specific integrated circuit (ASIC), a controller, a programmable logic device, a chipset, and/or a field programmable gate array (FPGA). Processing system 600 may control one or more other components of repeater 410. Processing system 600 may be capable of performing various communication-related processing (e.g., amplification, self-interference cancellation (SIC), frequency translation, etc.).

Transceiver 605 may include a component capable of transmitting and/or receiving information over wireless channels via antennas 610. For example, transceiver 605 may include a transmitter and a receiver. Transceiver 605 may be capable of performing various communication-related processing (e.g., filtering, de/coding, de/modulation, etc.). Antenna 610 may include a component capable of receiving information and transmitting information via wireless channels. Antenna 610 may include a single or a multi-antenna system (e.g., a MIMO antenna system). Antenna 610 may provide one or more forms of diversity (e.g., spatial, pattern, or polarization).

Memory 615 may include a component capable of storing information (e.g., data and/or instructions). For example, memory 615 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Although FIG. 6A illustrates exemplary components of repeater 410, in other implementations, repeater 410 may include fewer, additional, and/or different components than those depicted in FIG. 6A. It will be appreciated that one or more components of repeater 410 may be capable of performing one or more other tasks associated with one or more other components of repeater 410.

Figure 6B:
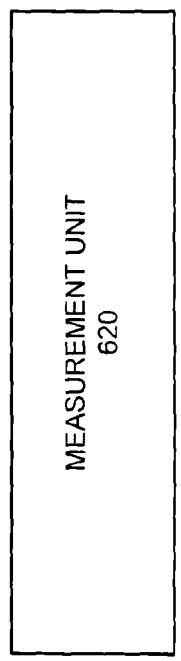
FIG. 6B is a diagram illustrating an exemplary functional component of the repeater.
Figure 6B:
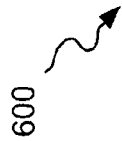

FIG. 6B is a diagram illustrating an exemplary functional component capable of performing one or more operations associated with the concepts described herein. In one embodiment the exemplary functional component may be implemented in processing system 600 of repeater 410. However, it will be appreciated that this functional component may be implemented in connection with, for example, other components (e.g. transceiver 605) of repeater 410, in combination with two or more components (e.g., processing system 600, transceiver 605, memory 615) of repeater 410, and/or as an additional component(s) to those previously described in FIG. 6A. As illustrated, the functional component includes a measurement unit 620.

Measurement unit 620 may include a component capable of performing channel measurements. For example, measurement unit 620 may generate channel estimates based on reference signals (e.g., SRSs) received from UE 415. As will be described below, repeater 410 may forward these measurements to wireless station 405.

Although, FIG. 6B illustrates exemplary functional components, in other implementations, repeater 410 may include fewer, additional, and/or different functional components than those depicted in FIG. 6B. It will be appreciated that the functional component of repeater 410 may be capable of performing one or more other tasks associated with one or more other components of repeater 410.

Figure 7:
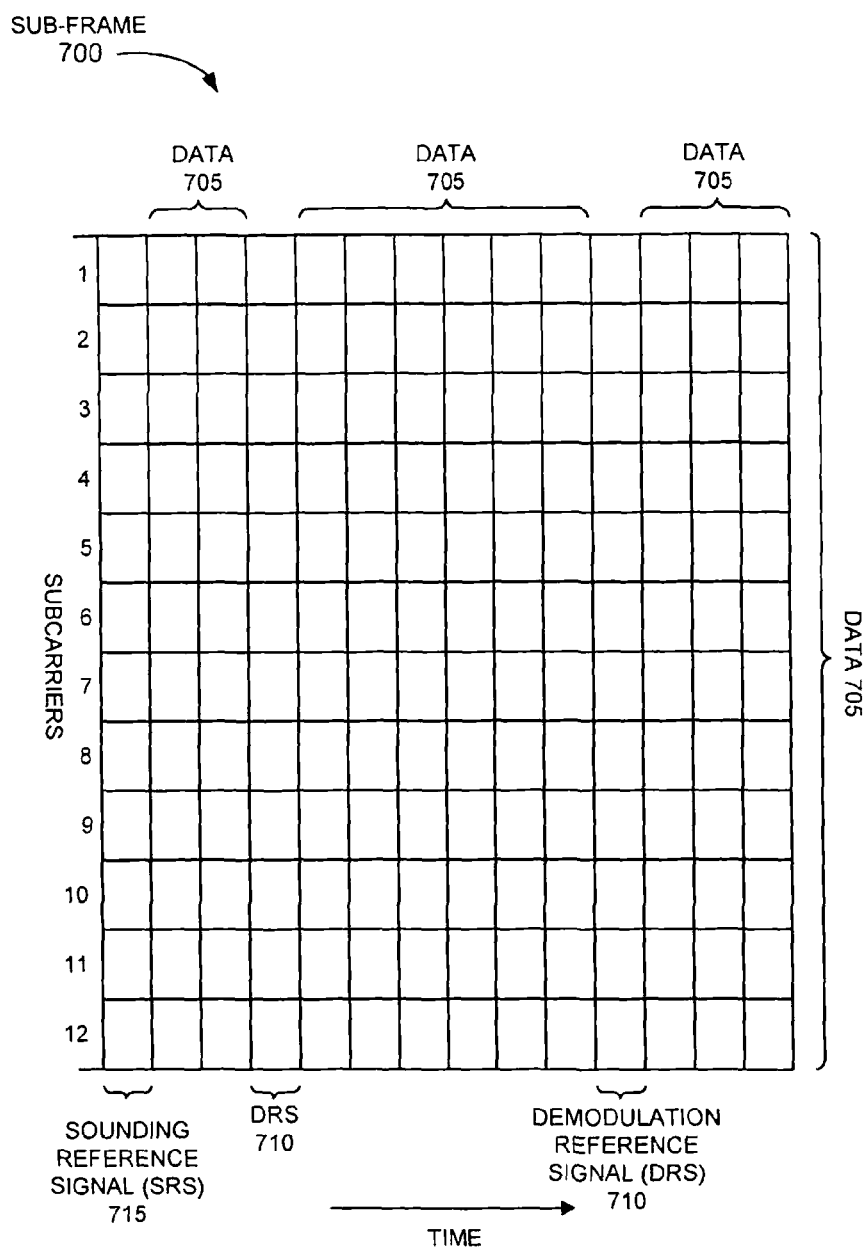
FIG. 7 is a diagram illustrating an exemplary Orthogonal Frequency-Division Multiplexing (OFDM) time-frequency grid that may be associated with an uplink transmission.

As previously described, a determination as to whether an association between a repeater and a UE is made may be based on measurements of reference signals, such as, for example, sounding reference signals (SRS). FIG. 7 is a diagram of an exemplary sub-frame 700 that may be applicable to a LTE communication system (e.g., communication system 400). For example, sub-frame 700 may correspond to an Orthogonal Frequency-Division Multiplexing (OFDM) time-frequency grid for an uplink transmission. As illustrated, sub-frame 700 may include data 705, a demodulation reference signal (DRS) 710, and a channel sounding reference signal (SRS) 715. Data 705 may include uplink data. DRS 710 may be associated with transmission of uplink data and/or control signaling (e.g., to facilitate coherent demodulation). SRS 715 may be periodically transmitted by a UE, such as, for example, UE 415. Typically, SRSs are transmitted independently of a transmission of any uplink data (i.e. the UE may transmit a SRS in a sub-frame when the UE does not have any data transmission. An eNodeB may utilize SRS 715 to estimate uplink characteristics, control the uplink power, estimate the timing of UE transmissions, and/or to derive timing-control commands for uplink time alignment. As will be described in greater detail below, the eNodeB may utilize, for example, SRS 715 to make association determinations.

Figure 8:
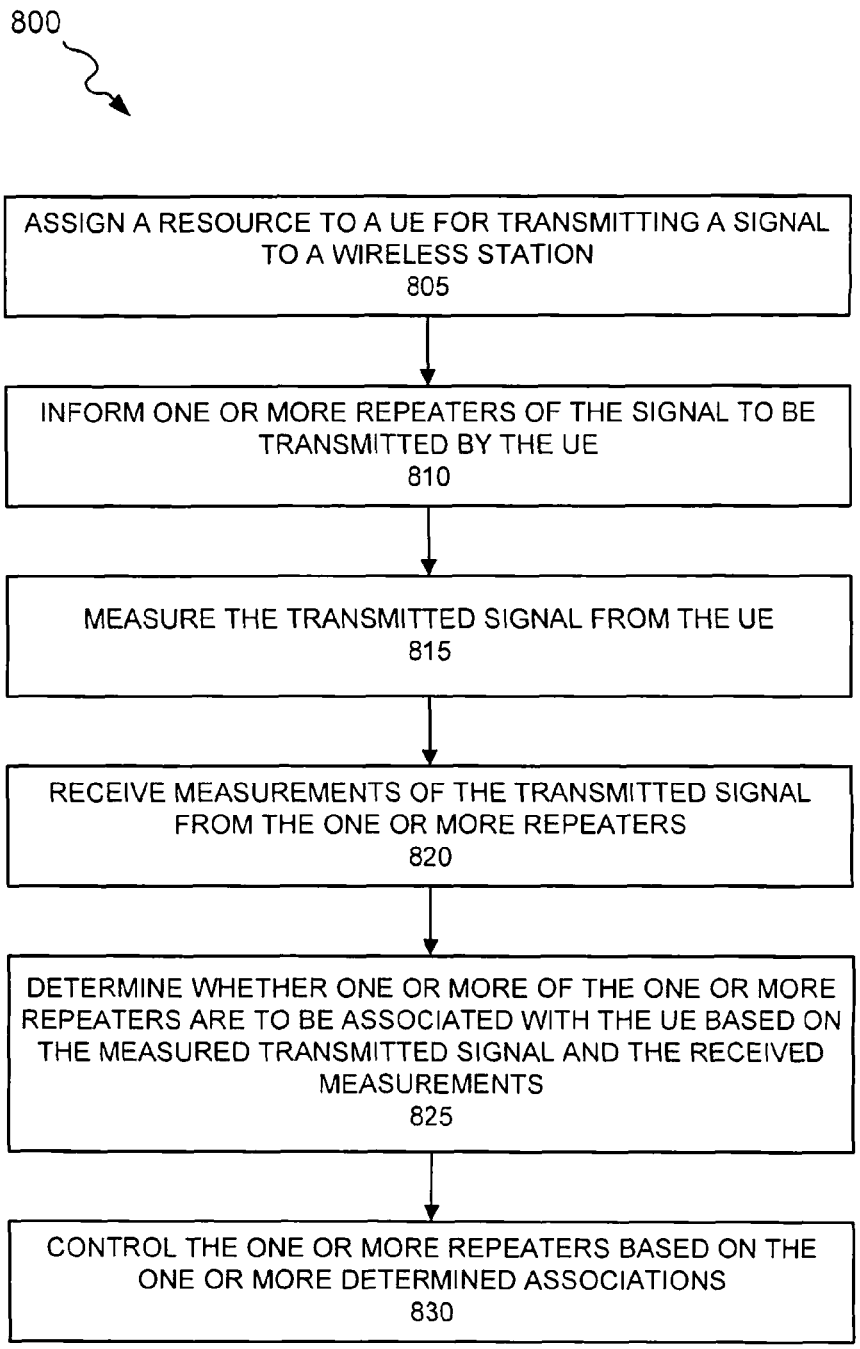
FIG. 8 is a flow diagram related to an exemplary process for determining an association from the perspective of the wireless station.
Figure 9:
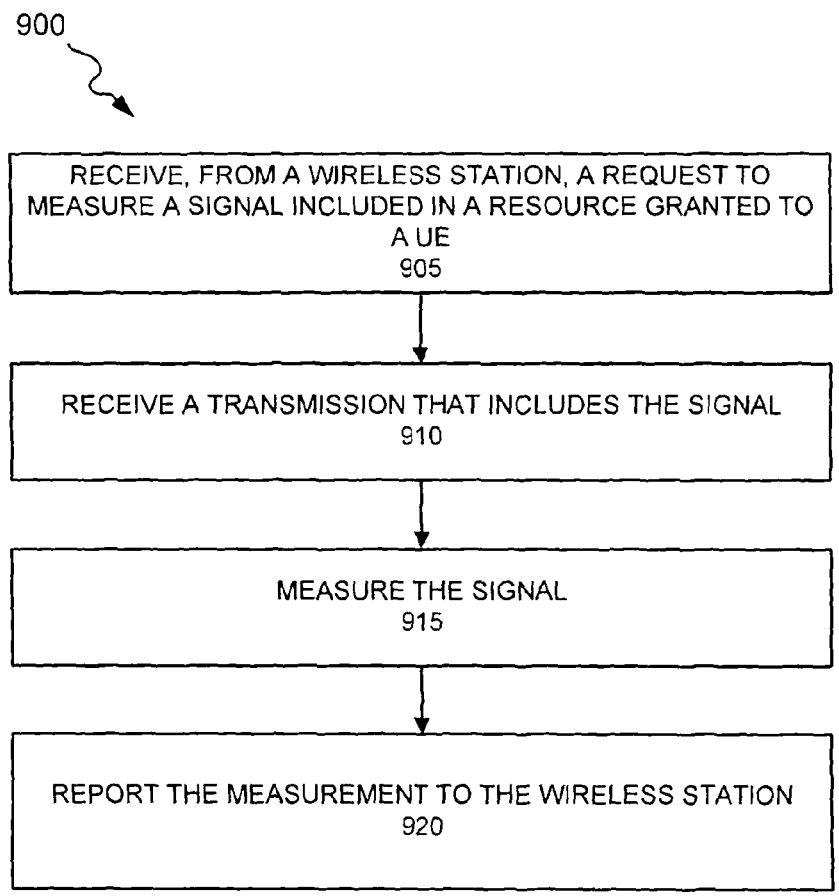
FIG. 9 is a flow diagram related to an exemplary process for determining an association from the perspective of the repeater.
Figure 10:
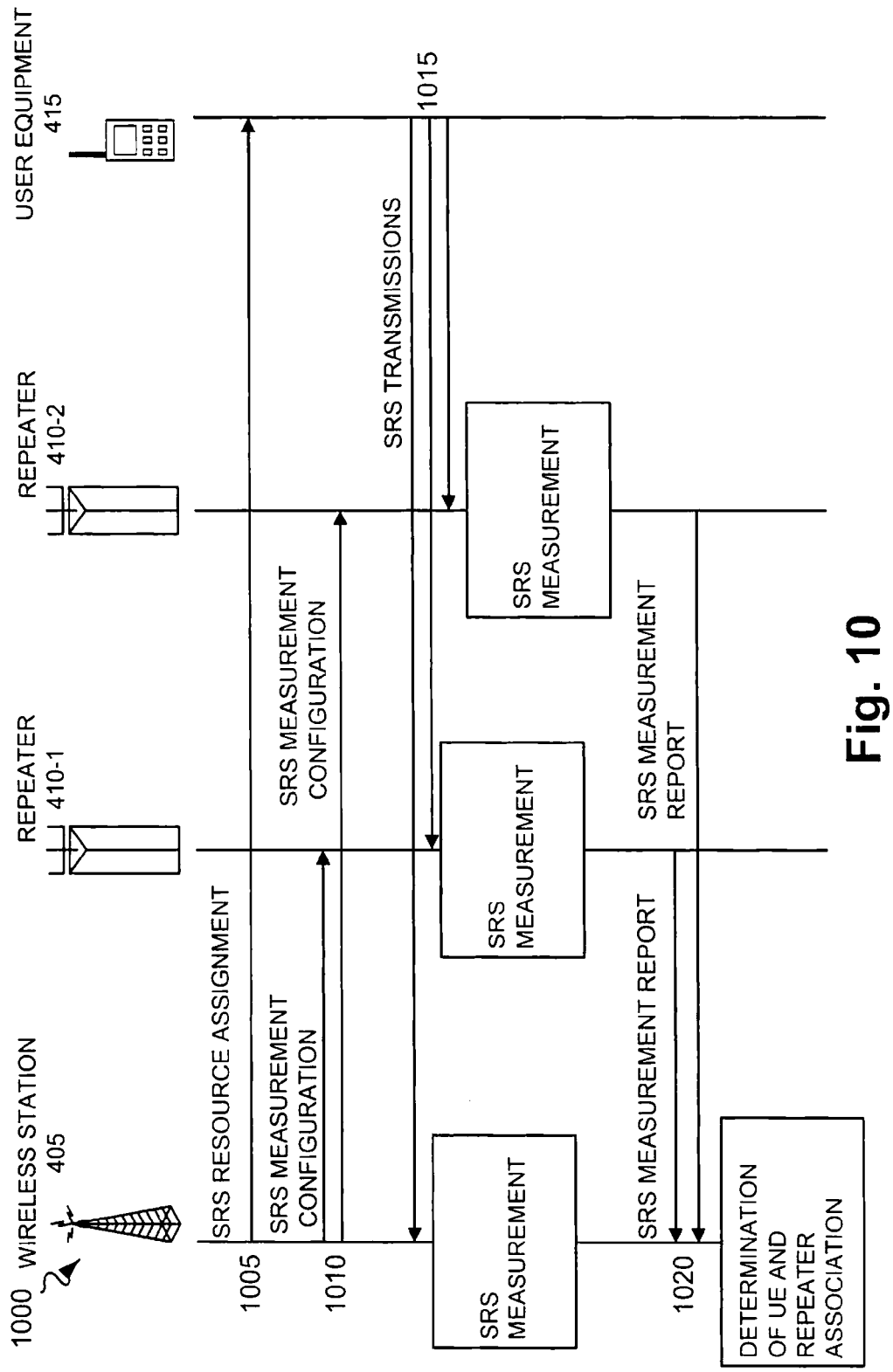
FIG. 10 is a diagram illustrating an exemplary scenario in which the processes described herein may be implemented.

Exemplary processes are described below, in connection with FIGS. 8-10. FIG. 8 is a flow diagram relating to a process that may be performed by wireless station 405 for determining an association. FIG. 9 is a flow diagram relating to a process that may be performed by repeater 410 for determining the association. FIG. 10 is a messaging diagram that illustrates various transmissions between wireless station 405, repeaters 410 and UE 415 in connection with the association scheme described herein. The number of repeaters is exemplary, and in other circumstances a greater number or a lesser number of repeaters may be involved.

For purposes of discussion, the exemplary processes will be described based on communication system 400 depicted in FIG. 4B. However, it will be appreciated that the exemplary processes may be performed in communication system 400 depicted in FIG. 4A, in which different devices may be present.

Process 800 may begin with assigning a resource to a UE for transmitting a signal to a wireless station (block 805). For example, as illustrated in FIG. 10, wireless station 405 may transmit 1005 a signal that includes a SRS resource assignment to UE 415.

Referring back to FIG. 8, one or more repeaters of the signal to be transmitted by the UE may be informed (block 810). For example, as illustrated in FIG. 10, wireless station 405 (e.g. repeater controller 520) may transmit 1010 SRS measurement configuration information to repeaters 410-1 and 410-2. The SRS measurement configuration information may include, for example, time and frequency information as to when UE 415 is to begin transmitting. Measurement unit 620 may utilize the SRS measurement configuration information to perform measurements at the appropriate time, frequency, etc., to which SRS 725 is transmitted by UE 415. Since variables, such as cell size and/or propagation delay, may affect when the repeaters receive SRS 725, measurement unit 620 may need to search within a time window to perform a measurement of SRS 725. The SRS measurement configuration information may include a grant of resources in which repeaters 410-1 and 410-2 may utilize to report the SRS measurements to wireless station 405.

Referring back to FIG. 8, the transmitted signal from the UE may be measured (block 815). For example, as illustrated in FIG. 10, UE 415 may transmit 1015 a SRS transmission. Wireless station 405 and repeaters 410-1 and 410-2 may receive the signal (e.g., SRS 725). Wireless station 405 may perform channel estimations (e.g., SRS measurements) based on the received signal. Repeaters 410-1 and 410-2 may also perform channel estimations based on the received signal.

Referring back to FIG. 8, measurements from the one or more repeaters may be received (block 820). For example, as illustrated in FIG. 10, wireless station 405 may receive 1020 SRS measurement reports from repeaters 410-1 and 410-2. It will be appreciated that depending on the location of UE 415 and repeaters 410-1 and 410-2, it is possible for one or both of these repeaters not to, for example, detect SRS 725. For example, repeater 410-1 or repeater 410-2 may be located at a cell edge opposite to UE 415. In such an instance, the SRS measurement report from such a repeater may include low or zero measurement values.

Referring back to FIG. 8, a determination whether one or more of the one or more repeaters are to be associated with the UE based on the measured transmitted signal and the received measurements may be made (block 825). For example, as illustrated in FIG. 10, wireless station 405 may determine whether repeater 410-1 and/or repeater 410-2 should be associated with UE 415. Wireless station 405 (e.g. UE and repeater associator 525) may make such a determination based on the SRS measurements taken by wireless station 405 and the SRS measurements received from repeaters 410-1 and 410-2. For example, UE and repeater associator 525 may utilize the SRS measurements it took as a reference. UE and repeater associator 525 may make comparisons with its reference SRS measurements and the received SRS measurements from repeaters 410-1 and 410-2 to determine whether an association should be made. For example, UE and repeater associator 525 may determine an association when a repeater's measurement is above a threshold value or within a range of values. The threshold value and/or the range of values may be based on the reference SRS measurements. The threshold value and/or the range of values may be a configuration of the network and may include any value(s). For example, where a repeater's SRS measurement indicates, for example, a signal strength that is −10 to −20 dB weaker than wireless station 405, UE and repeater associator 525 may determine that an association would not be advantageous. On the other hand, for example, where a repeater's SRS measurement indicates, for example, a signal strength that is −1 to −5 dB weaker than wireless station 405 and/or substantially equal to wireless station 405, UE and repeater associator 525 may determine that an association would be advantageous. Additionally, UE and repeater associator 525 may utilize a repeater's SRS measurement as a reference. For example, when UE and repeater associator 525 determines that a repeater should be associated with UE 415, UE and repeater associator 525 may utilize the SRS measurement corresponding to that repeater as a reference for other repeaters.

One or more of the repeaters may be controlled based on the one or more determined associations (block 830). For example, wireless station 405 (e.g., repeater controller 520) may control repeater 410-1 and/or repeater 410-2 when it is determined that repeater 410-1 and/or repeater 410-2 should be associated with UE 415. The control of repeater 410-1 and/or repeater 410-2 may include, for example, frequency selection.

Although FIG. 8 illustrates an exemplary process 800, in other implementations, process 800 may include fewer, different, and/or additional operations.

As previously described, FIG. 9 illustrates a flow diagram from the perspective of a repeater, such as repeaters 410. As illustrated in FIG. 9, exemplary process 900 may begin with receiving, from a wireless station, a request to measure a signal included in a resource granted to a UE (block 1205). For example, as previously described in connection with FIG. 10, repeaters 410-1 and 410-2 may receive SRS measurement configuration information from wireless station 405. Wireless station 405 may control repeaters 410-1 and 410-2.

A transmission that includes the signal may be received by a repeater (block 910). For example, repeaters 410-1 and 410-2 may receive SRS 725. It will be appreciated that, in some instances, a repeater may not receive SRS 725. For example, where the repeater is out of range of UE 415.

The signal may be measured (block 915). For example, measurement unit 620 may receive the signal (e.g., SRS 725). Measurement unit 620 may measure SRS 725 based on the SRS measurement configuration information.

The measurement for determining whether the repeater is to be associated with the UE may be reported to the wireless station (block 920). For example, repeater 410-1 and 410-2 may report their SRS measurements to wireless station 405, as previously described in connection with FIG. 10. These measurements may be used by wireless station 405 to determine whether repeater 410-1 and/or 410-2 should be associated with UE 415.

Although FIG. 9 illustrates an exemplary process 900, in other implementations, process 1200 may include fewer, different, and/or additional operations.

As described herein, a scheme for determining whether an association between a repeater and a UE should be made may be based on reference signals transmitted from the UE. In one implementation, as described in connection with the LTE communication system, the reference signals may include SRS. Additionally, as described in connection with the LTE communication system, the scheme may support legacy LTE UEs (e.g. Release 8 and below). Other advantages from this scheme may include, for example, improved connectivity between devices, improved quality of service, as well as other advantages that necessarily flow therefrom. It will be appreciated that the scheme described herein may be applied to communication systems, other than LTE, where associations between devices are made.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to the processes illustrated in FIGS. 8 and 9, the order of the blocks may be modified in other implementations. Further, non-dependent blocks may be performed in parallel. Further one or more blocks may be omitted. It will be appreciated that one or more of the processes described herein may be implemented as a computer program. The computer program may be stored on a computer-readable medium or represented in some other type of medium (e.g., a transmission medium).

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein. Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such.

The term "may" is used throughout this application and is intended to be interpreted, for example, as "having the potential to," "configured to," or "capable of," and not in a mandatory sense (e.g., as "must"). The terms "a" and "an" are intended to be interpreted to include, for example, one or more items. Where only one item is intended, the term "one" or similar language is used. Further, the phrase "based on" is intended to be interpreted to mean, for example, "based, at least in part, on," unless explicitly stated otherwise. The term "and/or" is intended to be interpreted to include any and all combinations of one or more of the associated list items.

What is claimed is:

1. A method performed in a multi-hop wireless network by a radio base station that includes radio transceiving circuitry for communicating with one or more intermediate relay radio nodes and a user equipment (UE), comprising:

assigning a radio channel resource to the UE to be utilized by the UE for a radio transmission;

informing the one or more intermediate relay radio nodes of the assignment using the radio transceiving circuitry;

receiving, at the radio transceiving circuitry, the radio transmission from the UE;

measuring the received UE radio transmission;

receiving one or more reference signal measurements of the radio transmission from the UE from the one or more intermediate relay radio nodes, wherein the one or more measurements from the one or more intermediate radio relay nodes depends on a location of the UE and the location of the intermediate relay node; and determining whether one or more of the one or more intermediate relay radio nodes are to be associated with the UE based on the measured UE radio transmission and the received one or more measurements of the radio transmission from the UE from the one or more intermediate relay radio nodes.

2. The method of claim 1, further comprising:

assigning one or more dedicated radio channel resources to the one or more intermediate relay radio nodes, and where the receiving comprises:

receiving on the one or more dedicated radio channel resources the one or more measurements of the transmission from the one or more intermediate relay radio nodes.

3. The method of claim 1, where the radio transmission includes a sounding reference signal that can be utilized for channel estimation.

4. The method of claim 1, where the determining comprises:

comparing the one or more measurements to a threshold;

selecting which of the one or more intermediate relay radio nodes are to be associated with the UE based on the comparison; and associating the selected one or more intermediate relay radio nodes with the UE.

5. The method of claim 1, further comprising:

utilizing the measured transmission from the UE as a reference measurement, and where the determining comprises:

determining whether the one or more of the one or more intermediate relay radio nodes are to be associated with the UE based on the reference measurement.

6. The method of claim 1, further comprising:

controlling the one or more intermediate relay radio nodes based on the determined association.

7. The method of claim 6, where the controlling comprises:

managing a frequency spectrum over which the at least one of the one or more intermediate relay nodes operate with respect to the UE.

8. A method performed by an intermediate relay radio node in a multi-hop wireless network, comprising:

receiving a request to measure a radio signal associated with a radio channel resource granted to a user equipment (UE) transmitting the radio signal;

measuring the received UE radio signal including one or more reference signals, wherein the measuring depends on a location of the UE and the location of the intermediate relay node; and transmitting the measurement, using a radio transmitter, to a radio base station;

receiving, using a radio receiver, a base station radio signal from the radio base station indicating whether the intermediate relay radio node is to be associated with the UE.

9. The method of claim 8, where the reporting comprises:

transmitting the measurement on a dedicated radio channel resource assigned by the radio base station.

10. A radio base station for operating in a wireless environment, comprising:

a radio transmitter;

a radio receiver;

one or more antennas coupled to the radio transmitter and the radio receiver; and a processing system coupled to the radio transmitter and the radio receiver and configured to:

assign a radio channel resource to a user equipment (UE) to be utilized by the UE for transmitting a radio transmission to the radio base station, inform one or more intermediate relay radio nodes of the assignment of the radio resource using the radio transceiving circuitry, receive, at the radio receiver, the radio transmission sent by the UE in the assigned radio resource, measure the UE radio transmission received at the radio receiver, receive, at the radio receiver, one or more reference signal measurements of the UE radio transmission from the one or more intermediate relay radio nodes, wherein the one or more measurements from the one or more intermediate radio relay nodes depends on a location of the UE and the location of the intermediate relay node, and determine whether to associate one or more of the one or more intermediate relay radio nodes with the UE based on the measured UE radio signal and the one or more measurements of the radio transmission from the UE from the one or more intermediate relay radio nodes.

11. The device of claim 10, where the UE includes at least one of a mobile station, a wireless telephone, a personal digital assistant, a web browsing device, or a subscriber station.

12. The device of claim 11, where the mobile station, the wireless telephone, the personal digital assistant, the web browsing device, and the subscriber station operate according to the long term evolution (LTE) release 8 and below communication standard.

13. The device of claim 10, where the one or more intermediate relay radio nodes include a layer one or a layer two repeater.

14. The device of claim 10, where the processor is further configured to:

utilize the measured UE radio transmission received at the radio receiver as a reference with respect to the one or more measurements, and associate one or more of the one or more intermediate relay radio nodes with the UE when the one or more measurements corresponding to the one or more intermediate relay radio nodes each have a value that is above a threshold or within a range of values.

15. The device of claim 10, where the radio transmission includes an uplink reference signal.

16. An intermediate relay radio node capable of operating in a multi-hop wireless environment, comprising:

a radio transmitter;

a radio receiver;

one or more antennas coupled to the radio transmitter and the radio receiver; and a processing system coupled to the radio transmitter and the radio receiver and configured to:

receive a request from a radio base station to measure a radio transmission signal from a user equipment (UE) sent using a radio channel resource granted to the UE, measure at the radio receiver the radio transmission signal from the UE including one or more reference signals, wherein the measurement depends on a location of the UE and the location of the intermediate relay node, and report to the radio base station via the radio transmitter a result of the radio transmission signal measured so that the radio base station can determine whether to associate the intermediate relay radio node with the UE.

17. The intermediate relay radio node of claim 16, where the intermediate relay radio node includes a repeater.

18. The intermediate relay radio node of claim 16, where the intermediate relay radio node is configured to operate according to a long term evolution (LTE) communication standard.

19. A non-transitory, computer-readable storage medium storing a computer program including instructions, which when executed by one or more computers included in a radio base station, allows the radio base station to control operation of one or more intermediate relay radio nodes in a multi-hop wireless environment, where the instructions include:
- instructions for having the radio base station assign to a user equipment (UE) an uplink radio channel resource for the user equipment to transmit a UE reference signal;
- instructions for receiving, at radio transceiving circuitry in the radio base station, the UE reference signal;
- instructions for analyzing one or more measurements of the UE reference signal from the one or more intermediate relay radio nodes and the received UE reference signal, wherein the one or more measurements from the one or more intermediate radio relay nodes depends on a location of the UE and the location of the intermediate relay node;
- instructions for determining whether to associate one or more of the one or more intermediate relay radio nodes with the user equipment based on the analyzing of the one or more measurements and the received UE reference signal; and
- instructions for controlling an operation performed by the one or more of the one or more intermediate relay radio nodes when it is determined that the one or more of the one or more intermediate relay radio nodes are to be associated with the user equipment.

20. The computer program of claim 19, where the one or more intermediate relay radio nodes include one or more frequency selective repeaters, and the instructions to control the operation include controlling the frequency spectrum in which the one or more frequency selective repeaters operate in relation to communication with the user station.

* * * * *

UNITED STATES PATENT AND TRADEMARK OFFICE
CERTIFICATE OF CORRECTION

PATENT NO. : 8,867,383 B2  Page 1 of 1
APPLICATION NO. : 13/002081
DATED : October 21, 2014
INVENTOR(S) : Frenger et al.

It is certified that error appears in the above-identified patent and that said Letters Patent is hereby corrected as shown below:

In the Claims

In Column 11, Line 31, in Claim 7, delete "relay nodes" and insert -- relay radio nodes --, therefor.

Signed and Sealed this
Fourteenth Day of July, 2015

Michelle K. Lee
*Director of the United States Patent and Trademark Office*